US008377855B2

(12) United States Patent
Frost et al.

(10) Patent No.: US 8,377,855 B2
(45) Date of Patent: Feb. 19, 2013

(54) METHODS AND COMPOSITIONS FOR TREATING SUBTERRANEAN ZONES

(75) Inventors: Keith A. Frost, Duncan, OK (US); Bradley L. Todd, Duncan, OK (US); Richard W. Pauls, Duncan, OK (US); Ian Robb, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 1551 days.

(21) Appl. No.: 11/653,038

(22) Filed: Jan. 12, 2007

(65) Prior Publication Data

US 2007/0111898 A1   May 17, 2007

Related U.S. Application Data

(62) Division of application No. 10/665,310, filed on Sep. 19, 2003, now Pat. No. 7,159,658.

(51) Int. Cl.
*C09K 8/90* (2006.01)

(52) U.S. Cl. ........ 507/271; 507/214; 507/215; 507/216; 507/217; 507/267; 166/305.1

(58) Field of Classification Search .................. None
See application file for complete search history.

(56) References Cited

U.S. PATENT DOCUMENTS

| 4,083,407 | A | * | 4/1978 | Griffin et al. | 166/291 |
|---|---|---|---|---|---|
| 4,257,483 | A | * | 3/1981 | Morris et al. | 166/292 |
| 4,552,675 | A | | 11/1985 | Brown et al. | 252/8.55 |
| 4,633,949 | A | | 1/1987 | Crowe | 166/279 |
| 5,065,822 | A | * | 11/1991 | Miller et al. | 166/295 |
| 5,128,046 | A | * | 7/1992 | Marble et al. | 210/705 |
| 5,564,105 | A | * | 10/1996 | Alvino et al. | 588/20 |
| 5,624,886 | A | * | 4/1997 | Dawson et al. | 507/217 |
| 5,645,688 | A | * | 7/1997 | Payton et al. | 162/76 |
| 5,759,964 | A | | 6/1998 | Shuchart et al. | 507/209 |
| 5,783,527 | A | * | 7/1998 | Dobson et al. | 507/269 |
| 6,213,213 | B1 | | 4/2001 | Van Batenburg et al. | 166/300 |

FOREIGN PATENT DOCUMENTS

EP   0 559 418 A2   9/1993

OTHER PUBLICATIONS

Foreign Search Report and Opinion (PCT Appl. No. GB2004/003842), Dec. 14, 2004.
Degration of Double-Stranded Xanthan by Hydrogen Peroxide in the Presence of Ferrous Ions: Comparison to Acid Hydrolysis by Bjorn E. Christensen, Mildrid H. Myhr and Olay Simidsrod, Aug. 1, 1995.
"Fenton'S Reagent Iron-Catalyzed Hydrogen Peroxide" by The Industrial Wastewater Referenced in the Library Peroxide Applications, Mar. 8, 2002.
"Effect of Ionic Interactions on the Oxidation of Fe(II) With $H^2 0^2$ in Aqueous Solutions" by Frank J. Millero, Sara Sotolongo, Daviid J. Stade and Carmen A. Vega In the Journal of Solution Chemistry, vol. 20, Nov. 11, 1991.
Oxidation of Ascorbic Acid and Metal Ions As Affected by NaCl by Stela Harel in J. Agnc. Food Chem. 42, 2402-2406, 1994.

* cited by examiner

*Primary Examiner* — John J Figueroa
(74) *Attorney, Agent, or Firm* — Robert A. Kent; McDermott Will & Emery LLP

(57) ABSTRACT

Methods and compositions for breaking treatment fluids utilized in the stimulation of a subterranean formation.

19 Claims, No Drawings

METHODS AND COMPOSITIONS FOR TREATING SUBTERRANEAN ZONES

CROSS-REFERENCE TO RELATED APPLICATION

This application is a divisional of application Ser. No. 10/665,310 filed on Sep. 19, 2003, now U.S. Pat. No. 7,159,658.

BACKGROUND

The present embodiment relates to methods and compositions for treating subterranean zones in formations penetrated by well bores utilizing strongly delayed polymer breakers.

Treating fluids containing polymer breakers are used in a variety of operations and treatments in oil and gas wells. An example of a well completion treatment which utilizes a polymer breaker in a high viscosity fluid is known in the art as gravel packing. In gravel packing treatments, solid gravel particles such as sand are carried by way of the well bore to a subterranean zone in which a gravel pack is to be placed by a viscous gelled carrier fluid. That is, particulate solids (referred to in the art as gravel) are suspended in the high viscosity carrier fluid at the surface and carried to the subterranean zone in which the gravel pack is to be placed. Once the gravel is placed in the zone, the viscous carrier fluid is broken (the viscosity is reduced) and recovered (returned to the surface) by including a delayed polymer breaker, i.e., a viscosity reducing agent, in the carrier fluid. The gravel pack produced functions as a filter to separate formation solids from produced fluids while permitting the produced fluids to flow into and through the well bore.

In open hole gravel packing procedures, a non-viscous carrier fluid can be used that includes a polymer breaker which breaks down drill-in fluid filter cake left on the walls of the open hole well bore from the well bore drilling operation. The carrier fluid for open hole gravel packing can also be viscosified. In that case, the delayed breaker in the carrier fluid breaks the carrier fluid and the filter cake so that the carrier fluid and the filter cake can be removed from the subterranean zone.

The well completion procedures utilizing polymer breakers can be improved if the polymer breakers have a delayed reaction on the viscosity of the treatment fluid or on the degradation of the filter cake. For example, breaker compositions that include sodium persulfate and lithium hypochlorite which generally provide delayed breaks in the range of 0 to 2 hours are utilized in these operations. Recently, however, it has been recognized that even greater improvements to and simplification of well completion procedures can be realized if the breaks in viscosity of a carrier fluid or filter cake integrity can be even more strongly delayed. In this context and as used herein, the term "strongly delayed" as used in connection with a break in viscosity of a carrier fluid or filter cake integrity means a break delay of more than 3 hours.

In well temperatures above 150° F., t-butyl hydroperoxide has been found to function as a strongly delayed breaker. However, in well temperatures below 150° F., it has proven to be difficult to obtain strongly delayed, controllable break times of biopolymer components such as xanthan and succinoglycan gums of viscosified fluids or filter cakes. Attempts to obtain strongly delayed, controllable break times by reducing the concentration of the breaker generally results in incomplete breaks of the polymer and may be damaging to the permeability of the producing zone.

Thus, there is a need for treating fluid breaker systems which can provide controllable, strongly delayed breaks of biopolymer viscosified aqueous well treating fluids and filter cakes at temperatures ranging from 80 to 150° F.

DETAILED DESCRIPTION

The methods and compositions of the present embodiment provide a means for treating subterranean zones using water based treating fluids which contain strongly delayed water soluble polymer breakers. According to one method of the present embodiment, a water based viscous treating fluid composition is provided comprising water, a viscosity increasing polymer and a strongly delayed polymer breaker composition that comprises a mixture of a hydrogen peroxide source, a ferrous ion source and a chelating agent. The viscous treating fluid composition is introduced into a subterranean zone by way of a well bore penetrating the zone and the strongly delayed polymer breaker is allowed to break the viscous treating fluid into a thin fluid of reduced viscosity. Thereafter, the treating fluid is recovered from the subterranean zone.

According to another method of the present embodiment, a water based non-viscous treating fluid composition is provided comprising water and a strongly delayed polymer breaker composition that comprises a mixture of a hydrogen peroxide source, a ferrous ion source and a chelating agent. The treating fluid composition is introduced into a subterranean zone by way of an open hole well bore penetrating the zone that has filter cake on the walls thereof. The delayed polymer breaker in the treating fluid composition is then allowed to break the filter cake. Thereafter, the treating fluid and broken filter cake are removed from the subterranean zone.

According to yet another method of the present embodiment, a water based viscous treating fluid composition is provided comprising water, a viscosity increasing polymer and a strongly delayed polymer breaker that comprises a mixture of a hydrogen peroxide source, a ferrous ion source and a chelating agent. The viscous treating fluid composition is introduced into a subterranean zone by way of an open-hole well bore penetrating the zone that has filter cake on the walls thereof. The strongly delayed polymer breaker in the viscous treating fluid is then allowed to break the viscous treating fluid and the filter cake. Thereafter, the broken treating fluid and broken filter cake are removed from the subterranean zone.

A water based treating fluid composition of the present embodiment comprises water and a strongly delayed polymer breaker comprising a mixture of a hydrogen peroxide source, a ferrous ion source and a chelating agent. According to a preferred embodiment, the treating fluid composition includes a viscosity increasing polymer.

The water based treating fluid compositions of the present embodiment can be utilized for forming gravel packs in a subterranean zone or for carrying out other completion, stimulation or work over procedures. In gravel packing or other applications in subterranean zones, water based treating fluid compositions are often utilized. In some of the applications, the treating fluid compositions must have high viscosities which are provided by viscosity increasing polymers. In order to recover such viscous treating fluid compositions from the subterranean zones, strongly delayed polymer breakers are included in the fluids. In other applications, the water based treating fluid compositions are placed into well bores with drill-in fluid filter cake on the well bore walls and at least one function of the water based treating fluid containing a strongly delayed polymer breaker is to degrade the filter cake.

A strongly delayed breaker system having a desired level of controllability is accomplished by preparing a composition which includes a hydrogen peroxide source, a ferrous ion source and a chelating agent capable of chelating iron. This multi-component breaker composition provides additional parameters for control by changing the concentration and relative ratios of the different components.

Generally, to break a polymer such as xanthan gum requires the generation of a certain number of cleavages in the polymer backbone or polymer branches so as to break the polymer and cause the desired reduction in viscosity. Accordingly, the concentration of oxidizer needed to break the xanthan gum in a xanthan gum solution can be determined based on the amount of xanthan gum in the solution. Stated another way, the number of oxidizer molecules is determined by the number of cleavages in the polymer backbone needed to achieve a desired reduction in viscosity.

To obtain a strongly delayed break of the polymer or a slow rate of break down of the polymer, with a strong oxidizer, would require a reduction of the concentration of the oxidizer. However, there is a limit to the degree to which the concentration of the oxidizer can be reduced because as noted above, there are a certain number of cleavages in the polymer backbone that are necessary to achieve the desired reduction in viscosity. Therefore, to achieve a strongly delayed polymer breaker system, a control mechanism other than the concentration of oxidizer alone is necessary. Such control is provided by the activator system of the compositions of the present embodiment. According to the strongly delayed polymer breaker compositions of the present embodiment, strongly delayed polymer breaks are accomplished, not by reducing the oxidizer alone, but by changes to the concentrations of the components of the activator.

It will be understood that if a strong oxidizer is added to a viscous gel, it would fairly quickly reduce the viscosity and would not result in a strongly delayed break of the gel. Instead according to the strongly delayed polymer breaker compositions of the present embodiment, a weak oxidizer (hydrogen peroxide at the temperatures under consideration) is used that is not capable of breaking the xanthan polymer on its own and the hydrogen peroxide is slowly catalyzed to a strong oxidizer. According to the strongly delayed polymer breaker compositions of the present embodiment, the ferrous ion source in combination with hydrogen peroxide generates a hydroxyl radical that is a strong oxidizer. The ferrous ion is not consumed in this reaction (the hydrogen peroxide is) so the concentration of the ferrous ion drives the rate at which hydroxyl radicals are generated. In such a system, however, at neutral pH, ferric iron will precipitate from solution as iron hydroxide. So, to prevent such precipitation, citrate anion is added to complex with the ferrous ion. However, citrate tends to interfere with the generation of the hydroxyl radical. Therefore, the more citrate that is added, the more interference is caused and the slower the generation of the stronger oxidizer. Consequently, the ferrous ion and the citrate anion constitute the activator system for the strongly delayed polymer breaker compositions of the present embodiment.

The water utilized in the well treating fluids of this embodiment can be fresh water or salt water. The term "salt water" is used herein to mean unsaturated salt solutions and saturated salt solutions including brines and seawater. Generally, salt is added to the water to provide clay stability and to increase the density of the water based fluid. Examples of salts that can be used include, but are not limited to, sodium chloride, sodium bromide, calcium chloride, potassium chloride, ammonium chloride and mixtures thereof. The salt or salts used can be present in the salt water in a concentration up to about 66% by weight thereof and the salt water can have a density up to about 15.5 pounds per gallon. The water may include any of the other conventional additives such as proppants, pH control agents, bactericides, clay stabilizers, surfactants and the like which do not adversely react with the other components of the viscosified aqueous well treating fluids to inhibit performance of the desired treatment upon a subterranean formation.

When a viscous treating fluid composition is utilized in accordance with this embodiment, various viscosity increasing polymers can be included in the treating fluid composition. A preferred group of viscosity increasing polymers include biopolymers such as xanthan and succinoglycan gums.

Preferably, such biopolymers are generally present in the viscous fluid compositions in an amount in the range of from about 0.25% to about 1.5% by weight of the water in the compositions.

A preferred strongly delayed polymer breaker composition according to the present embodiment is effective in breaking viscosified aqueous well treating fluids at ambient temperature and at a pH greater than 3.0 to 4.0, preferably at a pH of 7.0. The composition of the strongly delayed polymer breaker includes a mixture of ferrous ions and hydrogen peroxide which promotes the oxidation of organic compounds by the generation of the hydroxyl radical from the hydrogen peroxide. The production of the hydroxyl radical, which is a strong oxidizing agent, is catalyzed by the presence of the ferrous ions.

The source of ferrous ions in the preferred strongly delayed polymer breaker composition, may be one or more ferrous compounds such as iron(II) sulfate heptahydrate ($FeSO_4.7H_2O$), iron(II) chloride ($FeCl_2$), and iron(II) gluconate. However, it will be understood that other sources of ferrous ions may also be used.

Also, the source of hydrogen peroxide in the preferred strongly delayed polymer breaker composition, is sodium perborate tetrahydrate ($NaBO_3.4H_2O$) or a solution of concentrated hydrogen peroxide ($H_2O_2$).

Preferably, the strongly delayed polymer breaker composition also includes sodium chloride (NaCl) which increases the rate of oxidation of organic compounds by the hydroxyl radical.

Generally, when compositions which include a source of ferrous ions and a source of hydrogen peroxide reach a pH of greater than 3.0 to 4.0, ferric ions in equilibrium with ferrous ions precipitate with hydroxyl ions as ferric hydroxide. The precipitation of ferric hydroxide from the strongly delayed polymer breaker composition of the present embodiment is undesirable and preferably is avoided. The precipitation of such iron compounds from solution, preferably is prevented or retarded by the addition to the strongly delayed polymer breaker composition of a chelating agent which forms a complex with the ferric ions thus preventing or retarding such precipitation. The chelating agent preferably keeps the ferric ions in solution without overly interfering with the $Fe^{2+}/Fe^{3+}$ redox activity during hydroxyl radical formation. Preferred chelating agents which keep the ferric ions in solution and do not overly interfere with the redox activity include but are not limited to citric acid, sodium citrate and iminodiacetic acid. Preferably, the strongly delayed polymer breaker composition includes a molar excess of the chelating agent relative to the ferrous ions so as to avoid the precipitation of ferric hydroxide and the ratio may also be used as one of the mechanisms to control the rate of polymer degradation. Most preferably, the strongly delayed polymer breaker composition includes a ratio of chelating agent to ferrous ions of from 3:1 to 6:1.

The ratio of chelating agent to ferrous ions in the strongly delayed polymer breaker composition of the present embodiment may be utilized to vary the break time of the viscosified aqueous well treating fluids. In addition, by varying the concentrations of the source of hydrogen peroxide, the chelating agent and ferrous ions, a high degree of flexibility and control over the break time of the viscosified aqueous well treating fluids can be maintained.

In the practice of the present embodiment, the strongly delayed polymer breaker composition can be injected with a gravel pack fluid or, if added to a carrier fluid, injected into a subterranean formation prior to, simultaneously with, or subsequent to injection of the gravel pack fluid. Generally, the strongly delayed polymer breaker composition will be admixed with a carrier fluid.

The amount of strongly delayed polymer breaker composition used is that amount required to reduce the viscosity of the viscosified aqueous well treating fluids at a static temperature in the range of from about 80° F. to about 150° F. to a preselected lower viscosity or to a complete break. The optimum or effective amount of the strongly delayed polymer breaker composition employed in accordance with the present embodiment depends on factors such as the particular gelling agent and its concentration, the formation temperature and other factors. Typically, however, the strongly delayed polymer breaker composition is employed in the range of from about 0.01 to about 500 pounds per 1000 gallons of viscosified aqueous well treating fluids.

Suspended particulate solids such as gravel for forming gravel packs can be included in the water based viscous treating fluid compositions. The gravel particles are suspended in a viscous treating fluid composition and are deposited in a subterranean zone when the viscosity of the viscous treating fluid composition is broken. Examples of useful particulate solids include, but are not limited to, graded sand, bauxite, ceramic materials, glass materials, walnut hulls, polymer beads and the like. Of the various particulate solids that can be used, graded sand is generally preferred.

A preferred method of this invention for treating a subterranean zone comprises the steps of: (a) providing a water-based, viscous treating fluid composition comprising water, a viscosity increasing polymer and a water-soluble, strongly delayed polymer breaker composition that comprises a hydrogen peroxide source, a ferrous ion source and a chelating agent; (b) introducing the viscous treating fluid composition into the subterranean zone through a well bore penetrating the subterranean zone; and (c) allowing the strongly delayed polymer breaker composition to break the viscous treating fluid composition into a thin fluid of reduced viscosity so that it can be removed from the subterranean zone.

Another preferred method of treating a subterranean zone comprises the steps of: (a) providing a water-based, non-viscous treating fluid composition comprising water and a water-soluble, strongly delayed polymer breaker composition that comprises a hydrogen peroxide source, a ferrous iron compound and a chelating agent; (b) introducing the non-viscous treating fluid composition into the subterranean zone by way of an open hole well bore penetrating the subterranean zone, the well bore having filter cake on the walls thereof; and (c) allowing the strongly delayed polymer breaker composition to break the filter cake so that the treating fluid and the broken filter cake can be removed from the subterranean zone.

Yet another preferred method of treating a subterranean zone comprises the steps of: (a) providing a water based viscous treating fluid composition comprising water, a viscosity increasing polymer and a water soluble strongly delayed polymer breaker composition that comprises a mixture of a hydrogen peroxide source, a ferrous iron compound and a chelating agent; (b) introducing the viscous treating fluid composition into the subterranean zone by way of an open hole well bore penetrating the subterranean zone that has filter cake on the walls thereof; and (c) allowing the strongly delayed polymer breaker composition in the viscous treating fluid to break the viscous treating fluid and the filter cake so that the broken treating fluid and the broken filter cake can be removed from the subterranean zone.

A preferred water-based treating fluid composition of this embodiment comprises: water and a strongly delayed polymer breaker composition comprising a mixture of a hydrogen peroxide source, a ferrous iron compound and a chelating agent.

Another preferred water-based treating fluid composition comprises: water, a viscosity increasing polymer and a strongly delayed polymer breaker composition comprising a mixture of a hydrogen peroxide source, a ferrous iron compound and a chelating agent.

In order to further illustrate the methods of this invention, the following examples are given.

EXAMPLE 1

Solutions of xanthan gum in water were prepared by heating to 85° C. to ensure polymer hydration and then cooling to room temperature. Known amounts of such xanthan solutions were then mixed with a breaker composition that included various quantities of $Fe^{2+}$/citrate solutions and hydrogen peroxide as indicated below in Table 1. The solutions all contained 0.05% xanthan gum and had a pH of between 4 and 5. The hydrogen peroxide was diluted from a 3% solution.

TABLE 1

| Solution | Ferrous ion conc. Mol/l | Citrate conc. Mol/l | Hydrogen peroxide % w/v |
|---|---|---|---|
| A | $5.2 \times 10^{-4}$ | $1 \times 10^{-3}$ | 0.075 |
| B | $1.7 \times 10^{-4}$ | $3.2 \times 10^{-4}$ | 0.075 |
| C | $1.7 \times 10^{-4}$ | $3.2 \times 10^{-4}$ | 0.225 |
| D | $1.7 \times 10^{-4}$ | $3.2 \times 10^{-4}$ | 0.75 |
| E | $5.2 \times 10^{-4}$ | $1 \times 10^{-3}$ | 0.75 |

The mixtures of the xanthan gum solutions and breaker compositions were then placed in a standard Ubbelohde dilution viscometer. The viscosity of the mixtures was dominated by the xanthan gum. Flow times in excess of that for the solvent (water) are a direct measure of the molecular mass of the xanthan gum, such that decreasing flow times are a measure of the degradation of the xanthan gum. The flow times shown in Table 2 were measured within 5 minutes of mixing and until they approached that of the solvent. The solvent (water) flow time was 20.5 seconds. The data shown in Table 2, measured at ambient temperature, i.e. about 72° F., clearly show that xanthan gum degrades at ambient temperature in the presence of the breaker composition which included $Fe^{2+}$/citrate solutions and hydrogen peroxide.

TABLE 2

| Solution A | | Solution B | | Solution C | | Solution D | | Solution E | |
|---|---|---|---|---|---|---|---|---|---|
| Time of reaction (min) | Flow time (s) | Time of reaction (min) | Flow time (s) | Time of reaction (min) | Flow time (s) | Time of reaction (min) | Flow time (s) | Time of reaction (min) | Flow time (s) |
| 10 | 60 | 10 | 53.5 | 10 | 55 | 10 | 51.9 | 10 | 60 |
| 40 | 48.3 | 30 | 49.6 | 30 | 51.4 | 30 | 48.5 | 20 | 51.2 |
| 80 | 36.7 | 60 | 47 | 60 | 48.7 | 60 | 43 | 30 | 42 |
| 100 | 32 | 90 | 45 | 90 | 45 | 90 | 36.4 | 40 | 34.2 |
| | | 110 | 43.5 | 120 | 42 | 120 | 31.3 | 60 | 27.7 |
| | | | | | | 160 | 28.1 | 70 | 26.2 |

At the concentrations used, the rate of degradation of xanthan gum appears to be a function of the relative concentrations of $Fe^{2+}$/citrate.

EXAMPLE 2

The following standard xanthan gum based mud was prepared for the purpose of evaluating the effectiveness of various breaker compositions set forth in Table 3 below:

TABLE 3

| Component | Amount |
|---|---|
| Tap water | 332 mL |
| Potassium chloride (KCl) | 10.5 g. |
| Xanthan Gum | 0.85 g. |
| Starch | 7.4 g. |
| $CaCO_3$ with 5 micron median diameter | 10 g. |
| $CaCO_3$ with 25 micron median diameter | 25 g. |
| Magnesium oxide buffer | 0.18 g. |

The muds were prepared by adding the tap water to the mix cup of a Hamilton Beach mixer and placed on the mixer set at high shear rate (18,000 rpm). Next the KCl was added to the tap water. The xanthan and starch were then slowly added and left to mix at high speed for 15 minutes. The other components (calcium carbonate and magnesium oxide) were then added in the order set forth above. The mud was then placed in a sealed jar and placed in a roller oven (Fann Model 701) at 150° F. for 16 hours. After such hot rolling the muds were then ready for use as a test substrate as noted below.

Various breaker compositions were prepared according to the formulations set forth in Table 4:

TABLE 4

| Component | Amount | Amount | Amount |
|---|---|---|---|
| Tap water | 330 mL | 500 mL | 500 mL |
| Sodium perborate tetrahydrate | 3.96 g. | 6.00 g. | 6.00 g. |
| Citric acid | 1.23 g. | 1.86 g. | 0.94 g. |
| Sodium chloride (NaCl) | 0.6 g. | 1.00 g. | 1.00 g. |
| Iron sulfate heptahydrate | 0.59 g. | 0.45 g. | 0.45 g. |
| Citric acid:iron sulfate (molar ratio) | 3:1 | 6:1 | 3:1 |
| Break time | 5-5.5 hours | 5 hours | 4.5 hours |

The sodium perborate tetrahydrate, citric acid, sodium chloride and iron sulfate heptahydrate are commercially available from Sigma-Aldrich, Inc.

The breaker compositions were prepared by adding the tap water to a suitable beaker, a magnetic stir bar was placed in the beaker and the beaker was placed on a stir plate. The sodium perborate tetrahydrate, citric acid and sodium chloride were added to the beaker in the order set forth above. A pH probe was inserted into the solution once all components were dissolved. The pH of the composition was adjusted by slowly adding a 25% sodium hydroxide solution to raise the pH of the composition to 7. Then the iron sulfate heptahydrate was added to complete the preparation of a breaker composition. The molar ratios of citric acid to ferrous ion in the breaker composition of these examples were 3 to 1 and 6 to 1 as given in Table 4.

Approximately 300 mL of the drilling fluid was placed in a Fann Model 90B dynamic filtration system operating at 150° F. at 800 psi and 500 psi differential pressure across a 35 micron filter core. The Fann Model 90B is a dynamic filtration system for testing the filter cake building properties of drilling fluids. The machine was then programmed to apply the system pressure, differential pressure, temperature and shear rate needed to build a filter cake. The mud was then removed from the machine and the filter cake was left in place against the core material. The breaker solution was then placed in the machine and the machine was programmed to monitor the leak off rate through the filter cake at 150° F., 800 psi system pressure and 50 psi differential pressure. An increase in leak off rate was an indication of the degradation of the filter cake. The point at which an increased leak off rate was recorded is given in Table 4 as "Break Time." A detailed description of the use of a Fann Model 90B for such testing is described in SPE (Society of Professional Engineers) Paper No. 68968 entitled "Laboratory Device for Testing of Delayed-Breaker Solutions on Horizontal Wellbore Filter Cakes" the entire disclosure of which is hereby incorporated herein.

Although only a few exemplary embodiments have been described in detail above, those skilled in the art will readily appreciate that many other modifications are possible in the exemplary embodiments without materially departing from the novel teachings and advantages described herein. Accordingly, all such modifications are intended to be included within the scope of the following claims.

What is claimed is:

1. A treating fluid composition comprising:
water, a viscosity increasing polymer and a water-soluble strongly delayed polymer breaker composition, comprising a hydrogen peroxide source, a ferrous ion source and a chelating agent, wherein the water soluble, strongly delayed polymer breaker composition comprises a molar ratio of the chelating agent to the ferrous ion source of from 3:1 to 6:1.

2. The treating fluid composition according to claim 1 wherein the hydrogen peroxide source is selected from the group consisting of sodium perborate tetrahydrate and hydrogen peroxide.

3. The treating fluid composition according to claim 1 wherein the ferrous ion source is selected from the group consisting of iron (II) sulfate heptahydrate, iron (II) chloride and iron (II) gluconate.

4. The treating fluid composition according to claim 1 wherein the chelating agent is selected from the group consisting of citric acid, sodium citrate and iminodiacetic acid.

5. The treating fluid composition according to claim 1 wherein the water soluble, strongly delayed polymer breaker composition comprises a molar excess of the chelating agent relative to the ferrous ion source.

6. The treating fluid composition according to claim 1 wherein the water soluble, strongly delayed polymer breaker composition further comprises sodium chloride.

7. The treating fluid composition according to claim 1 wherein the water soluble, strongly delayed polymer breaker composition has a pH in the range of from about 3 to about 7.

8. The treating fluid composition according to claim 1 wherein the viscosity increasing polymer comprises a polysaccharide.

9. The treating fluid composition according to claim 8 wherein the viscosity increasing polymer comprises a polysaccharide selected from the group consisting of biopolymers and modified gums or celluloses and derivatives thereof.

10. The treating fluid composition according to claim 9 wherein the viscosity increasing polymer comprises xanthan gum.

11. The treating fluid composition according to claim 1 wherein the temperature of the subterranean zone ranges from about 80° F. to about 150° F.

12. A treating fluid composition comprising:
water and a water-soluble strongly delayed polymer breaker composition, comprising a hydrogen peroxide source, a ferrous ion source and a chelating agent, wherein the water soluble, strongly delayed polymer breaker composition comprises a molar ratio of the chelating agent to the ferrous ion source of from 3:1 to 6:1.

13. The treating fluid composition according to claim 12 wherein the hydrogen peroxide source is selected from the group consisting of sodium perborate tetrahydrate and hydrogen peroxide.

14. The treating fluid composition according to claim 12 wherein the ferrous ion source is selected from the group consisting of iron (II) sulfate heptahydrate, iron (II) chloride and iron (II) gluconate.

15. The treating fluid composition according to claim 12 wherein the chelating agent is selected from the group consisting of citric acid, sodium citrate and iminodiacetic acid.

16. The treating fluid composition according to claim 12 wherein the water-soluble, strongly delayed polymer breaker composition comprises a molar excess of the chelating agent relative to the ferrous ion source.

17. The treating fluid composition according to claim 12 wherein the water-soluble, strongly delayed polymer breaker composition further comprises sodium chloride.

18. The treating fluid composition according to claim 12 wherein the water soluble, strongly delayed polymer breaker composition has a pH in the range of from about 3 to about 7.

19. The treating fluid composition according to claim 12 wherein the temperature of the subterranean zone ranges from about 80° F. to about 150° F.

* * * * *